(12) United States Patent
Song et al.

(10) Patent No.: US 12,183,080 B2
(45) Date of Patent: Dec. 31, 2024

(54) OBJECT SORTING METHOD AND SYSTEM

(71) Applicant: CAINIAO SMART LOGISTICS HOLDING LIMITED, Grand Cayman (KY)

(72) Inventors: Xiaomin Song, Hangzhou (CN); Hangcheng Fan, Hangzhou (CN); Xiaohua Chen, Hangzhou (CN)

(73) Assignee: CAINIAO SMART LOGISTICS HOLDING LIMITED, Grand Cayman (KY)

(*) Notice: Subject to any disclaimer, the term of this patent is extended or adjusted under 35 U.S.C. 154(b) by 596 days.

(21) Appl. No.: 17/144,391

(22) Filed: Jan. 8, 2021

(65) Prior Publication Data

US 2021/0125137 A1    Apr. 29, 2021

Related U.S. Application Data

(63) Continuation of application No. PCT/CN2019/094156, filed on Jul. 1, 2019.

(30) Foreign Application Priority Data

Jul. 9, 2018   (CN) .......................... 201810745001.7

(51) Int. Cl.
   *G06V 20/52*     (2022.01)
   *G06K 7/14*      (2006.01)
   (Continued)

(52) U.S. Cl.
   CPC .......... *G06V 20/52* (2022.01); *G06K 7/1413* (2013.01); *G06Q 10/083* (2013.01); *G06V 30/424* (2022.01)

(58) Field of Classification Search
   CPC ..... G06V 20/52; G06V 30/424; G06Q 10/083
   See application file for complete search history.

(56) References Cited

U.S. PATENT DOCUMENTS

| | | | |
|---|---|---|---|
| 5,770,841 A | * | 6/1998 | Moed .................. B07C 3/00 235/375 |
| 6,664,959 B2 | | 12/2003 | Duluk, Jr. et al. |

(Continued)

FOREIGN PATENT DOCUMENTS

| CA | 2888153 A1 | 4/2014 |
|---|---|---|
| CN | 102161040 A | 8/2011 |

(Continued)

OTHER PUBLICATIONS

Xu, Xia. "Impact of Integrating Zone Bypass Conveyor on the Performance of a Pick-to-Light Order Picking System." 1507119 North Dakota State University, 2012. Ann Arbor: ProQuest. Web. May 2, 2024 (Year: 2012).*

(Continued)

*Primary Examiner* — Michael P Harrington

(57) ABSTRACT

Methods and systems for object sorting are provided. One method includes: recognizing object information of a plurality of objects in motion; obtaining destination information of the plurality of objects according to the object information, wherein the destination information of the plurality of objects comprises a plurality of destinations of the plurality of objects; determining a plurality of colors corresponding to the plurality of objects according to the plurality of destinations of the plurality of objects; and distinguishing the plurality of objects by using a plurality of lights of the plurality of colors respectively, to sort the plurality of objects in motion having the plurality of destinations.

19 Claims, 4 Drawing Sheets

(51) Int. Cl.
*G06Q 10/083* (2024.01)
*G06V 30/424* (2022.01)

(56) References Cited

U.S. PATENT DOCUMENTS

| | | | |
|---|---|---|---|
| 7,046,253 | B2 | 5/2006 | Long et al. |
| 7,667,604 | B2 | 2/2010 | Ebert et al. |
| 7,886,972 | B2 | 2/2011 | Skaaksrud et al. |
| 7,917,439 | B2 | 3/2011 | Barnes, Jr. |
| 8,433,437 | B1 | 4/2013 | Shakes et al. |
| 8,467,569 | B2 | 6/2013 | Berger et al. |
| 8,566,115 | B2 | 10/2013 | Moore |
| 8,666,804 | B2 | 3/2014 | Barnes, Jr. |
| 10,040,631 | B2 | 8/2018 | Shakes et al. |
| 10,262,282 | B2 | 4/2019 | Bishop |
| 10,508,010 | B2 | 12/2019 | High et al. |
| 10,572,498 | B2 | 2/2020 | Silverstein et al. |
| 2010/0158310 | A1 | 6/2010 | McQueen et al. |
| 2015/0225182 | A1 | 8/2015 | Ragusa et al. |
| 2017/0066597 | A1* | 3/2017 | Hiroi .................. G05B 15/02 |
| 2017/0249491 | A1 | 8/2017 | MacIntosh et al. |
| 2018/0068266 | A1 | 3/2018 | Kirmani et al. |
| 2019/0084009 | A1* | 3/2019 | Moriyama ............ G03B 21/14 |
| 2019/0291141 | A1* | 9/2019 | Koyanaka ............. G01N 21/71 |
| 2019/0354996 | A1 | 11/2019 | Dearing et al. |
| 2020/0290093 | A1* | 9/2020 | Moriyama ............. B07C 3/14 |

FOREIGN PATENT DOCUMENTS

| | | | |
|---|---|---|---|
| CN | 205628657 U | * | 10/2016 |
| CN | 106886877 A | | 6/2017 |
| CN | 107292358 A | | 10/2017 |
| CN | 206864075 U | | 1/2018 |
| EP | 0489267 A1 | | 6/1992 |
| JP | 2008-120518 A | | 5/2008 |
| JP | 2011213482 A | * | 10/2011 |
| JP | 2014-91609 A | | 5/2014 |
| JP | 2017-185431 A | | 10/2017 |
| WO | 2015/145982 A1 | | 10/2015 |

OTHER PUBLICATIONS

Notice of Reasons for Rejection mailed May 10, 2022, issued in related Japanese Application No. 2021-500616, with English machine translation (10 pages).

PCT International Search Report and the Written Opinion mailed Sep. 30, 2019, issued in related International Application No. PCT/CN2019/094156, with partial English translation (8 pages).

First Search dated Aug. 21, 2020, issued in related Chinese Application No. 201810745001.7 (2 pages).

First Office Action dated Aug. 31, 2020, issued in related Chinese Application No. 201810745001.7, with English machine translation (13 pages).

PCT International Preliminary Report on Patentability mailed Jan. 21, 2021, issued in related International Application No. PCT/CN2019/094156, with English translation (10 pages).

Extended European Search Report dated Feb. 22, 2022, issued in related European Application No. 19834275.0 (9 pages).

Second Office Action dated Apr. 26, 2021, issued in related Chinese Application No. 201810745001.7, with English machine translation (16 pages).

Notice of Reasons for Rejection for Japanese Application No. 2021-500616 mailed on May 30, 2023.

* cited by examiner

OBJECT SORTING METHOD AND SYSTEM

CROSS-REFERENCE TO RELATED APPLICATIONS

This application is a continuation application of International Patent Application No. PCT/CN2019/094156, filed on Jul. 1, 2019, and entitled "OBJECT SORTING METHOD AND SYSTEM." The PCT application claims priority to and benefits of the Chinese Patent Application No. 201810745001.7, entitled "OBJECT SORTING METHOD AND SYSTEM," filed on Jul. 9, 2018. The above referenced applications are incorporated herein by reference in their entirety.

TECHNICAL FIELD

This application relates to, but is not limited to, information management technologies, and in particular, to a method and system for object sorting.

BACKGROUND

Sorting at a distribution center is to sort logistic objects such as goods according to goods transportation routes, that is, destination flow directions (which usually are codes formed by letters and numbers).

With the rapid development of logistics, there is an urgent need for an efficient sorting method with low costs.

SUMMARY

This application provides a method and system for object sorting, to efficiently complete sorting with low costs.

To achieve the objective, this application provides a method for object sorting, including: recognizing object information of objects in motion; determining colors corresponding to the objects according to the recognized object information, where the colors are used for identifying different destinations; and distinguishing objects with different destinations by using the determined colors, to sort the objects in motion according to the colors.

In some embodiments, the method further includes: setting correspondences between different colors and different destinations.

In some embodiments, the determining colors corresponding to the objects according to the recognized object information includes: obtaining destination information according to the object information; and determining colors corresponding to the object information according to the correspondences and the obtained destination information.

In some embodiments, the distinguishing objects with different destinations by using the determined colors includes: projecting spotlight beams of the determined colors onto corresponding objects by using pre-installed projection light sources; and/or when the passage of the objects is sensed, setting colors of pre-installed light strips whose locations correspond to the objects to the determined colors.

This application further provides a system for object sorting, including a recognition unit, a processing and control unit, and an execution unit, where the recognition unit is configured to recognize object information of objects in motion; the processing and control unit is configured to: determine colors corresponding to the objects according to the recognized object information, where the colors are used for identifying different destinations; and output a control signal to the execution unit, to control the execution unit to distinguish objects with different destinations by using the determined colors; and the execution unit is configured to distinguish the objects with different destinations according to the control signal of the processing and control unit by using different colors.

In some embodiments, the processing and control unit is further configured to set correspondences between different colors and different destinations, and in the processing and control unit, the determining colors corresponding to the objects according to the recognized object information includes: obtaining destination information according to the object information; and determining colors corresponding to the object information according to the correspondences and the obtained destination information.

In some embodiments, the recognition unit includes a camera or a code reading device.

In some embodiments, the camera is a high-definition camera.

In some embodiments, a distance between the recognition unit and an object on a production line is adjustable.

In some embodiments, the recognition unit is disposed on a top portion of the production line or disposed on a side portion of the production line.

In some embodiments, the execution unit includes one or more groups of projection light sources.

In some embodiments, the execution unit includes two or three groups of projection light sources.

In some embodiments, the one group of projection light sources includes two or more light sources of different colors.

In some embodiments, the projection light source is disposed on the top portion of the production line or disposed on a side portion of the production line.

In some embodiments, the system further includes a sensor, where the execution unit includes light strips disposed on a side portion of the production line; and the processing and control unit is further configured to turn light strips whose locations correspond to the objects to the colors corresponding to the destination information when the pre-installed sensor senses the objects.

According to another aspect, this application provides another method for object sorting. The method includes: recognizing object information of a plurality of objects in motion; obtaining destination information of the plurality of objects according to the object information, wherein the destination information of the plurality of objects comprises a plurality of destinations of the plurality of objects; determining a plurality of colors corresponding to the plurality of objects according to the plurality of destinations of the plurality of objects; and distinguishing the plurality of objects by using a plurality of lights of the plurality of colors respectively, to sort the plurality of objects in motion having the plurality of destinations.

In some embodiments, distinguishing the plurality of objects by lighting the plurality of objects using the plurality of colors respectively comprises: upon sensing one of the plurality of objects passes by, turning on a light with a color corresponding to the object at a location corresponding to the object.

In some embodiments, the method further comprises: setting correspondences between different colors and different destinations in advance.

In some embodiments, determining a plurality of colors corresponding to the plurality of objects according to the plurality of destinations of the plurality of objects comprises: determining the plurality of colors corresponding to the plurality of objects according to the correspondences and the obtained destination information of the plurality of objects.

In some embodiments, distinguishing the plurality of objects by using a plurality of lights of the plurality of colors respectively comprises: projecting a plurality of spotlight beams of the plurality of colors onto the plurality of objects respectively by using a plurality of projection light sources.

In some embodiments, the plurality of projection light sources comprise one or more groups of projection light sources.

In some embodiments, the one or more groups of projection light sources comprise two or three groups of projection light sources.

In some embodiments, the object information comprises barcode information.

In some embodiments, recognizing object information of a plurality of objects in motion comprises: recognizing the barcode information by using a camera or a code reading device.

According to still another aspect, this application provides another system for object sorting. The system includes a production line, a camera or a code reading device disposed on a top portion of the production line or disposed on a side portion of the production line, a control device, and a lighting device communicatively connected with the control device, where a plurality of objects in motion are to be transported on the production line, and where: the camera or code reading device is configured to recognize object information of the plurality of objects in motion on the production line; the control device is configured to: obtain destination information of the plurality of objects according to the object information, wherein the destination information of the plurality of objects comprises a plurality of destinations of the plurality of objects; determine a plurality of colors corresponding to the plurality of objects according to the plurality of destinations of the plurality of objects; and output a control signal to the lighting device, to control the lighting device to distinguish the plurality of objects by using the plurality of colors; and the lighting device comprises a plurality of lights of the plurality of colors disposed on the production line for sorting the plurality of objects in motion having the plurality of destinations.

In some embodiments, the system further comprises a plurality of sensors disposed on the production line and configured to sense the plurality of objects in motion, wherein the plurality of lights are disposed on the side portion of the production line; and the control device is further configured to turn on, upon one of the plurality of sensors sensing one of the plurality of objects, a light with a color corresponding to the object at a location corresponding to the object.

In some embodiments, the control device is further configured to set correspondences between different colors and different destinations in advance.

In some embodiments, to determine a plurality of colors corresponding to the plurality of objects according to the plurality of destinations of the plurality of objects, the control device is further configured to: determine the plurality of colors corresponding to the plurality of objects according to the correspondences and the obtained destination information of the plurality of objects.

In some embodiments, the camera is a high-definition camera.

In some embodiments, a distance between camera or code reading device and the plurality of objects in motion on a production line is adjustable.

In some embodiments, the plurality of lights comprise one or more groups of projection light sources.

In some embodiments, the lighting device is configured to project, in response to the control signal, a plurality of spotlight beams of the plurality of colors onto the plurality of objects respectively by using the one or more groups of projection light sources.

In some embodiments, the plurality of lights comprise two or three groups of projection light sources.

In some embodiments, each of the one or more groups of projection light sources comprises two or more light sources of different colors.

In some embodiments, the one or more groups of projection light sources are disposed on the top portion of the production line or disposed on the side portion of the production line.

The embodiments of this application include: recognizing object information of objects in motion; determining colors corresponding to the objects according to the recognized object information, where the colors are used for identifying different destinations; and distinguishing objects with different destinations by using the determined colors, to sort the objects in motion according to the colors. In this application, instead of gray site shortcodes representing different destinations, different colors are used to identify objects, and objects in motion are sorted according to colors. Because the naked-eye recognition rate of colors is far higher than the naked-eye recognition rate of codes formed by letters and numbers, the efficiency of completing sorting is greatly improved. In addition, this application adopts a combination of automation and manual labor, thereby greatly reducing costs. It can be seen that efficient and low-cost sorting is achieved in this application.

Other features and advantages of this application will be described in the following specification, and become clear from the specification, or be understood through implementation of this application. Objectives and other advantages of this application may be achieved and obtained by using the structures described in the specification, the claims, and the accompanying drawings.

BRIEF DESCRIPTION OF THE DRAWINGS

The accompanying drawings are used to provide further understanding of the embodiments of this application, and constitute a part of the specification, which are used to explain this application in combination with the embodiments of this application, and do not constitute a limitation to the embodiments of this application.

DETAILED DESCRIPTION

Figure 1:
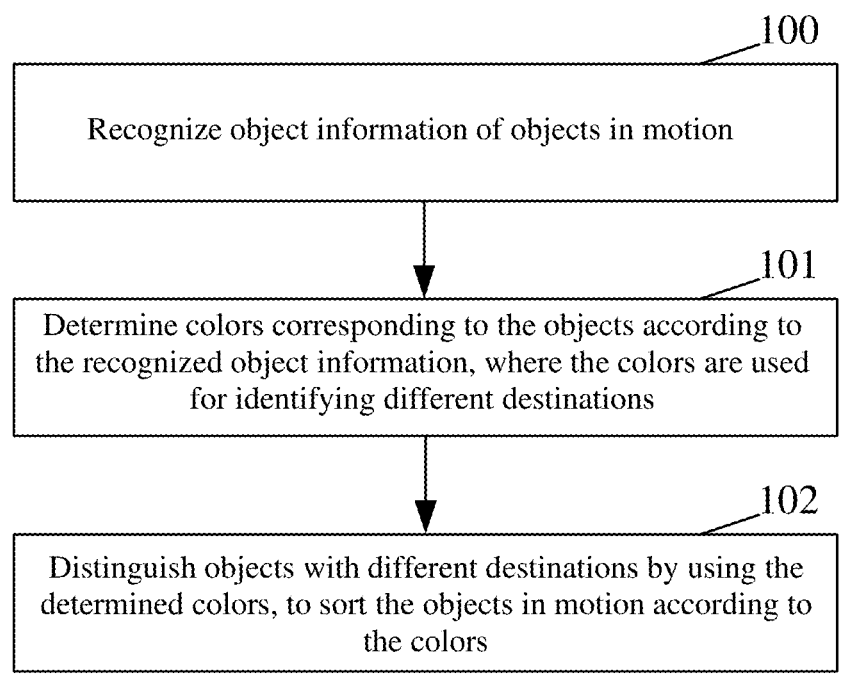
FIG. 1 is a flowchart of a method for object sorting, according to some embodiments of this application.

To make the objectives, embodiments, and advantages of this application clearer, the following describes this application in detail with reference to the accompanying drawings. It should be noted that, provided that no conflict is caused, the embodiments in this application or the features in the embodiments may be mutually combined.

In a configuration of this application, a computing device may include one or more processors (CPUs), an input/output interface, a network interface, and an internal memory.

The internal memory may include the following forms of computer-readable media: a non-persistent memory, a random access memory (RAM), and/or a non-volatile internal memory, for example, a read-only memory (ROM) or a flash memory (flash RAM). The internal memory is an example of the computer-readable medium.

The computer-readable medium includes a persistent medium and a non-persistent medium, a removable medium and a non-removable medium, which may implement storage of information by using any method or technology. The information may be computer-readable instructions, a data structure, a module of a program or other data. Examples of computer storage media include, but are not limited to, a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, tape and disk storage or another magnetic storage device or any other non-transmission media that may be configured to store information that a computing device can access. Based on the description in the specification, the computer-readable medium does not include non-transitory computer-readable media (transitory media), such as a modulated data signal and a carrier.

The steps shown in the flowcharts in the accompanying drawings may be performed in, for example, a computer system having a group of computer-executable instructions. In addition, although a logic order is shown in the flowcharts, in some events, the shown or described steps may be performed in an order different from the order herein.

A distribution center may mainly have two forms: a manual warehouse and an automated warehouse. Considering factors of order quantities and costs, the coverage rate of the automated warehouse is currently limited.

For the manual warehouse, a distribution line in a distribution center may be subdivided into links. A sorting worker needs to perform a sorting job on goods according to goods transportation routes, that is, destination flow directions (which usually are codes formed by letters and numbers, also referred to as gray site shortcodes). In other words, on the one hand, a sorting worker usually performs subdivision operations by watching the gray site shortcode, and one person averagely needs to memorize four to six codes each with up to six digits, for example, S16783. On the other hand, sorting workers at the distribution line work in a standing state for 10 to 12 hours on average. Investigation shows that standing and looking at moving codes for a long time tend to cause problems such as dizziness, easily resulting in incorrect sorting. In a scenario with an increasing speed, the naked-eye recognition rate of numbers and letters is greatly reduced, which is more prone to incorrect sorting.

For the automated warehouse, that is, a fully-automated distribution system, although waybill information is read through fully-automated scanning, and destinations of packages are distinguished by using a fully-automated system, the costs of the distribution lines in the distribution center are inevitably increased, and the costs of the entire automated distribution system cannot be offset in scenarios where some required daily order quantity (which is a large order quantity) is not reached. In addition, an irregularly-shaped piece such as an oil drum still cannot be automatically recognized by the automated distribution system, but needs to be sorted in another manual sorting line in the automated warehouse.

This application provides a method for object sorting. As shown in FIG. 1, the method includes:

Step 100. recognizing object information of objects in motion.

In some embodiments, a recognition device may be disposed on the top portion of a production line, to recognize object information of objects in motion, such as barcode information on package waybills.

In some embodiments, the recognition device may be disposed on the top portion of the production line. Alternatively, the recognition device may be disposed on a side portion of the production line, to adapt to a scenario in which a package waybill faces the sorting worker.

In some embodiments, the recognition device configured to recognize object information of objects in motion may be a camera such as a high-definition camera or may be any code reading device such as an infrared code reading portal frame, a fixed high-speed code reader or an industrial-grade personal digital assistant (PDA). Herein, the industrial-grade PDA is mainly applied to the industrial fields. Commonly used barcode scanners, radio frequency identification (RFID) readers/writers, point of sale (POS) machines (also referred to as point of sale information management systems), and the like may all be referred to as PDAs.

In some embodiments, a distance between the recognition device and an object on the production line is adjustable. In this way, the recognition rate may be improved by further reducing a distance between the recognition device and to-be-recognized objects.

In some embodiments, the method further includes: marking a position of an object such as a package to be placed on a conveyor belt of the production line, to prompt a sorting worker to place the object such as a package at the right position, to prevent the object such as a package from being randomly knocked out of a pre-determined range, thereby ensuring the calculation accuracy of the displacement of the object such as a package after code reading and identification are performed for the first time. This step may be implemented in advance.

Step 101. determining colors corresponding to the objects according to the recognized object information, where the colors are used for identifying different destinations.

Before this step, the method may further include: setting correspondences between different colors and different destinations. In other words, different destinations are represented by using different colors in advance.

Object information such as barcode information on a package waybill may correspond to package flow direction information. In other words, if object information such as barcode information on a package waybill is obtained, destination information may be obtained, and a color corresponding to the recognized object information may be determined according to the pre-installed correspondences between different colors and different destinations.

For example, one site represents one subdivided flow direction and has a corresponding code. On subdivided links of the production line, a site flow direction is used as a unit to divide the production line into work stations. A work station with a width of 1.8 meters (m) is used as a unit, and one site code corresponds to one color. For example, different destination sites may be distinguished by using three colors e.g., red, green, and blue.

In some embodiments, instead of gray site shortcodes representing different destinations, different colors are used to identify objects. Experiments show that when an object moves, the naked-eye recognition rate of colors is far higher than the naked-eye recognition rate of codes formed by letters and numbers.

Step 102. distinguishing objects with different destinations by using the determined colors, to sort the objects in motion according to the colors.

In some embodiments, projection light sources may be disposed on the top or side portion of the production line to project spotlight beams of corresponding colors onto corresponding objects such as packages; and/or light strips may be alternatively disposed on a side portion of the production line. When a pre-installed sensor senses the passage of an object such as a package, a light strip whose location corresponds to the object is turned on with a color corresponding to the destination of the package.

In some embodiments, the color of a pallet or another container corresponding to a destination flow direction of an object such as a package is the same as a color projected onto the object such as a package. In this way, objects such as packages are in a one-to-one correspondence to containers carrying the objects such as packages, and the objects and the containers are clearly distinguished by using the same color.

In some embodiments, a spotlight system may generate spotlight having an angle ranging from 15 degrees to 35 degrees.

In some embodiments, there may be one or more groups of projection light sources disposed on the top portion of the production line. For example, two or three groups of projection light sources may be included, to adapt to the incoming objects such as packages, thereby avoiding the problem that a next package has entered a projection region but cannot be spotlighted because the projection of a first light beam onto a current package is not completed.

In some embodiments, each group of projection light sources may include all light sources that have different colors and are used for identifying different destinations. For example, each group of projection light sources includes light sources having three colors, e.g., red, green, and blue. Alternatively, different groups of projection light sources respectively correspond to light sources of colors representing different destinations. Assuming that two groups of projection light sources are disposed, one group of projection light sources includes light sources of two colors, e.g., red and green, and the other group of projection light sources includes light sources of two colors, e.g., blue and yellow.

In this way, a sorting worker working at the production line may sort packages for which the sorting worker is responsible by recognizing colors. In addition, the naked-eye recognition rate of colors is far higher than the naked-eye recognition rate of codes formed by letters and numbers. Conventionally, one work station requires two sorting workers. However, in the embodiments of implementing object sorting by using different colors in this application, only one sorting worker is required to efficiently complete the sorting work. The other sorting worker may be responsible for a sorting job in other flow directions.

Figure 2:
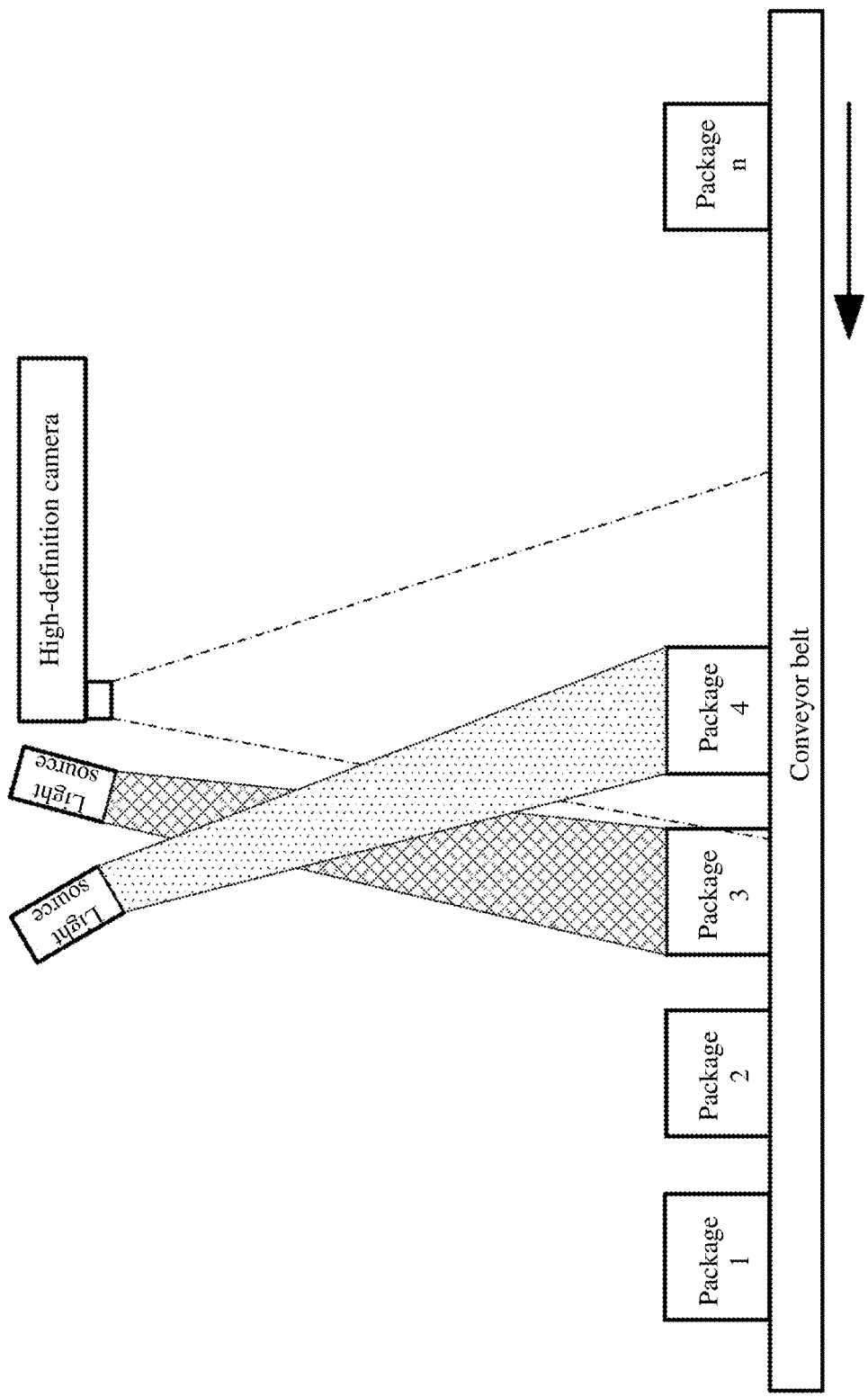
FIG. 2 is a schematic diagram of a scenario of implementing object sorting, according to some embodiments of this application.

In the embodiments shown in FIG. 2, the projection light source may be disposed on the top portion of the production line. Alternatively, in the embodiments shown in FIG. 3, the projection light source may be disposed on a side portion of the production line.

In some embodiments, at the beginning of the production line, a barcode on the surface of a package may be recognized by using a high-definition camera, and the barcode is then matched against existing goods flow direction data, to learn a destination flow direction corresponding to the package. The coordinates of a location at which the package may arrive in N seconds may be determined through calculation by using the initial coordinates of the package that are read by a camera on a portal frame and the flow speed of the production line. In this way, when the package moves past a sensor in a work station region of a worker responsible for the flow direction, the projection light source is triggered to emit light to track the package.

In the method for object sorting provided in this application, instead of gray site shortcodes representing different destinations, different colors are used to identify objects, and objects in motion are sorted according to colors. Because the naked-eye recognition rate of colors is far higher than the naked-eye recognition rate of codes formed by letters and numbers, the efficiency of completing sorting is greatly improved. In addition, this application adopts a combination of automation and manual labor, thereby greatly reducing costs. It can be seen that efficient and low-cost sorting is implemented in this application.

FIG. 2 is a schematic diagram of a scenario of implementing object sorting, according to some embodiments of this application. In the embodiments, the projection light source is disposed on the top portion of the production line. As shown in FIG. 2, in the embodiments, it is assumed that objects are packages on a distribution line in a distribution center, and the packages are delivered to two different destinations. It is assumed that the destinations are a destination A and a destination B in the embodiments, and it is assumed that a red spotlight is projected onto packages delivered to the destination A, and a green spotlight is projected onto packages delivered to the destination B.

In the embodiments, a high-definition camera is disposed on the top portion of the production line, and is configured to recognize barcode information on waybills of packages moving on the conveyor belt, to obtain destination flow direction information of the packages. It is assumed that through the recognition of the high-definition camera, a package 3 is delivered to the destination A and a package 4 is delivered to the destination B. As shown in FIG. 2, a red spotlight shown by oblique square shades is projected onto the package 3, and a green spotlight shown by dot pixel shades is projected onto the package 4. In this way, a sorting worker working at the production line may easily sort the packages in motion according to different colors.

Figure 3:
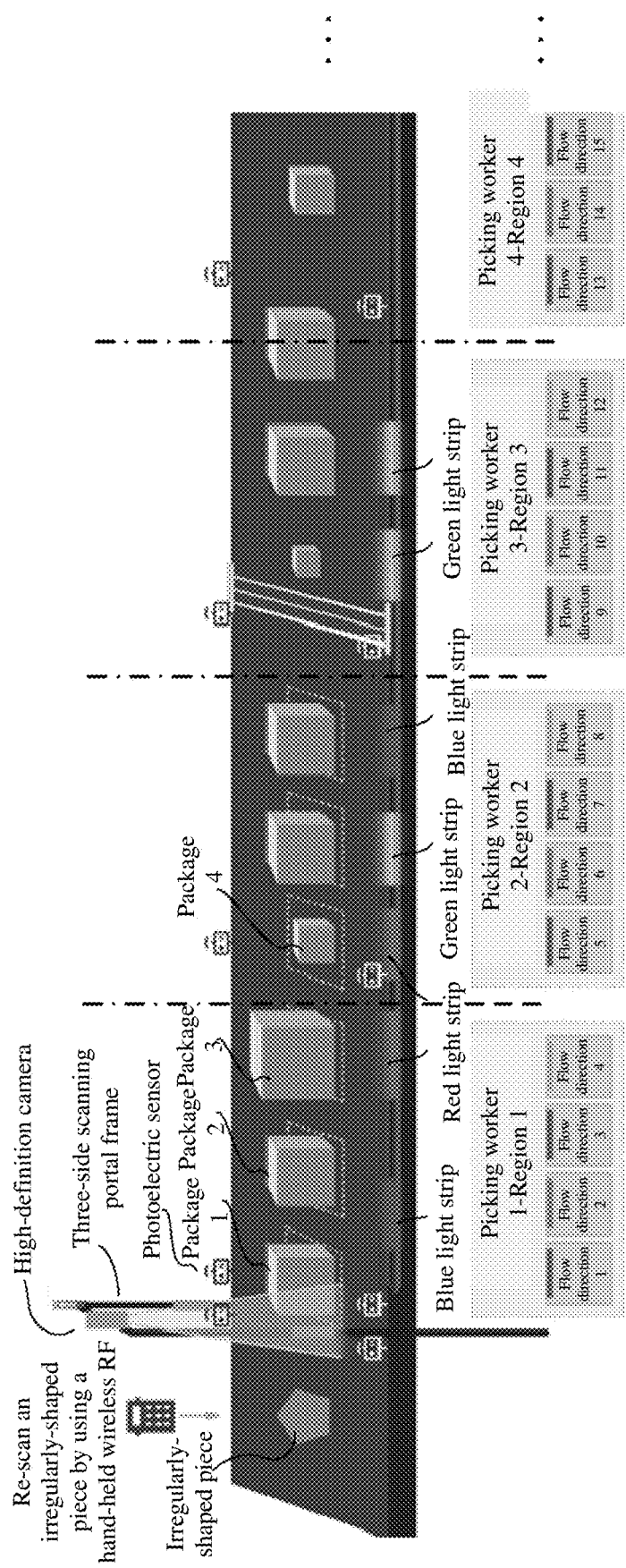
FIG. 3 is a schematic diagram of a scenario of implementing object sorting, according to other embodiments of this application.

FIG. 3 is a schematic diagram of a scenario of implementing object sorting, according to other embodiments of this application. In the embodiments, the projection light source is disposed on a side portion of the production line. As shown in FIG. 3, a high-definition camera is disposed on the top portion of the production line, such as a three-side scanning portal frame, and is configured to recognize barcode information on waybills of packages moving on the conveyor belt, to obtain destination flow direction information of the packages. When a sensor (or a plurality of sensors) such as a photoelectric sensor disposed on the production line senses that a package passes, a light strip (which is a segment of light strip whose location corresponds to the package with the conveyance of the package, for example, a segment of light strip whose width is the same as that of the package) is turned on with a color corresponding to the destination of the package. Visually observed, the segment of light strip moves as the package moves, and stops until a work station region is reached for which a picking worker corresponding to the destination is responsible. In this way, the picking worker may perform picking according to the observed color of the light strip. Next, the sorting worker may further place the packages at a pallet of a corresponding color for goods stacking. In this way, a sorting worker working at the production line may easily sort the packages in motion according to different colors. As shown in FIG. 3, the projection light sources disposed on the side portion of the production line include red, blue, and green light strips.

In the embodiments shown in FIG. 3, assuming that a picking worker 1 is responsible for a region 1, in a range of the region 1 of the picking worker 1, the picking worker 1 is responsible for picking packages whose destinations are a flow direction 1, a flow direction 2, a flow direction 3, and a flow direction 4. It is set that a package of the flow direction 1 is tracked by correspondingly turning on a red light strip, a package of the flow direction 2 is tracked by correspondingly turning on a green light strip, a package of the flow direction 3 is tracked by correspondingly turning on a blue light strip, and a package of the flow direction 4 is tracked by correspondingly turning on a yellow light strip.

A picking worker 2 is responsible for a region 2, and in a range of the region 2 of the picking worker 2, the picking worker 2 is responsible for picking packages whose destinations are a flow direction 5, a flow direction 6, a flow direction 7, and a flow direction 8. It is set that a package of the flow direction 5 is tracked by correspondingly turning on a red light strip, a package of the flow direction 6 is tracked by correspondingly turning on a green light strip, a package of the flow direction 7 is tracked by correspondingly turning on a blue light strip, and a package of the flow direction 8 is tracked by correspondingly turning on a yellow light strip.

A picking worker 3 is responsible for a region 3, and in a range of the region 3 of the picking worker 3, the picking worker 3 is responsible for picking packages whose destinations are a flow direction 9, a flow direction 10, a flow direction 11, and a flow direction 12. It is set that a package of the flow direction 9 is tracked by correspondingly turning on a red light strip, a package of the flow direction 10 is tracked by correspondingly turning on a green light strip, a package of the flow direction 11 is tracked by correspondingly turning on a blue light strip, and a package of the flow direction 12 is tracked by correspondingly turning on a yellow light strip.

A picking worker 4 is responsible for a region 4, and in a range of the region 4 of the picking worker 4, the picking worker 4 is responsible for picking packages whose destinations are a flow direction 13, a flow direction 14, a flow direction 15, and the like. It is set that a package of the flow direction 13 is tracked by correspondingly turning on a red light strip, a package of the flow direction 14 is tracked by correspondingly turning on a green light strip, a package of the flow direction 15 is tracked by correspondingly turning on a blue light strip, and the like. Details are not described one by one herein again.

The colors of light strips corresponding to flow directions of packages that different picking workers are responsible for picking may be the same or may be different.

As shown in FIG. 3, a package 1 is passing through a three-side scanning portal frame, and a high-definition camera disposed on the three-side scanning portal frame is obtaining destination information of the package 1 through scanning. In this embodiment, a destination address of a package 2 corresponds to the flow direction 3. Therefore, in the region 1, a segment of blue light strip is turned on at a position on the light strip corresponding to the width of the package, and with the movement of the package 2. Similarly, in this embodiment, a destination address of a package 3 corresponds to the flow direction 1. Therefore, in the region 1, a segment of red light strip is turned on at a position on the light strip corresponding to the width of the package and with the movement of the package 3. In this embodiment, in the region 2, a segment of red light strip corresponding to a package 4 moves with the package 4. However, in this situation, because it is in the region 2 that a light strip corresponding to the package 4 is turned on, a flow direction corresponding to the destination of the package 4 is the flow direction 5 for which the picking worker 2 is responsible.

In the embodiments, assuming that when the package 3 is conveyed in the region 1, although a light strip of a corresponding color is turned on, for some reason, the package fails to be picked by the picking worker 1, that is, a picking miss occurs. Therefore, in the following regions through which the package 3 passes, no corresponding light strip is turned on, and after the conveyance of the package 3 is finished on the production line, the package is placed on the production line again to be recognized and picked again.

In some embodiments, a plurality of picking workers responsible for the same flow direction may be arranged, to better avoid the problem of picking misses.

In some embodiments, for an irregularly-shaped piece such as an oil drum, as shown in FIG. 3, re-scanning may be performed by using a hand-held wireless RF to obtain destination flow direction information of the piece. In this way, irregularly-shaped packages in motion may also be sorted by using the projection light sources shown in FIG. 2 or FIG. 3 according to different colors.

Figure 4:
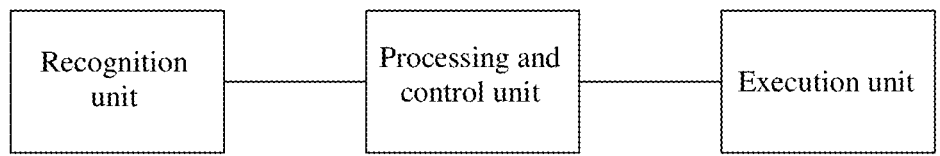
FIG. 4 is a schematic diagram of an architecture of a system for object sorting, according to some embodiments of this application.

FIG. 4 is a schematic diagram of an architecture of a system for object sorting, according to some embodiments of this application. As shown in FIG. 4, the system includes a recognition unit, a processing and control unit, and an execution unit. In some embodiments, the recognition unit, processing and control unit, and execution unit are also referred to as a recognition device, processing and control device, and execution device. For example, the recognition device includes a camera or a barcode reading device. The processing and control device includes a control chip such as a single-chip microcomputer. The execution device may include any lighting device for lighting the objects in motion in different colors, which are conveyed on the production line.

The recognition unit is configured to recognize object information of objects in motion.

The processing and control unit is configured to: determine colors corresponding to the objects according to the recognized object information, where the colors are used for identifying different destinations; and output a control signal to the execution unit, to control the execution unit to distinguish objects with different destinations by using the determined colors.

The execution unit is configured to distinguish the objects with different destinations according to the control signal of the processing and control unit by using different colors.

In some embodiments, the recognition unit may include a camera such as a high-definition camera or may include any code reading device, such as an infrared code reading portal frame, a fixed high-speed code reader, or a PDA.

In some embodiments, the recognition unit may be disposed on the top portion of a production line or disposed on a side portion of the production line.

In some embodiments, a distance between the recognition unit and an object on a production line is adjustable.

In some embodiments, the processing and control unit is further configured to set correspondences between different colors and different destinations.

In some embodiments, the processing and control unit may be implemented by using a control chip such as a single-chip microcomputer. There are many implementations, which are not limited herein.

In some embodiments, the execution unit may include one or more groups of projection light sources. For example, two or three groups of projection light sources may be included, to adapt to the incoming objects such as packages, thereby avoiding the problem that a next package has entered a projection region but cannot be spotlighted because the projection of a first light beam onto a current package is not completed.

In some embodiments, the one group of projection light sources includes two or more light sources of different colors.

In some embodiments, the projection light source may be disposed on the top portion of the production line or disposed on a side portion of the production line.

In some embodiments, the system for object sorting in this application further includes a pre-installed sensor configured to sense the objects in motion, where the execution unit includes light strips disposed on a side portion of the production line; and the processing and control unit is further configured to turn on light strips with the colors corresponding to the destination information of the objects when the pre-installed sensor senses the passage of the objects, where locations of the light strips correspond to the objects respectively.

In the system for object sorting provided in this application, instead of gray site shortcodes representing different destinations, different colors are used to identify objects, and objects in motion are sorted according to colors. Because the naked-eye recognition rate of colors is far higher than the naked-eye recognition rate of codes formed by letters and numbers, the efficiency of completing sorting is greatly improved. In addition, this application adopts a combination of automation and manual labor, thereby greatly reducing costs. It can be seen that efficient and low-cost sorting is implemented in this application.

Although the implementations of this application have been disclosed as above, the described content is implementations used for ease of understanding this application and is not intended to limit this application. Any person skilled in the field of this application can make any modification and change in the forms and details of the implementation without departing from the spirit and scope of this application. However, the protection scope of this application should still be subject to the scope described by the appended claims.

What is claimed is:

1. A method for object sorting, comprising:
    recognizing object information of a plurality of objects in motion on a production line, wherein the production line comprises a plurality of pickup regions for picking up the plurality of objects, and each of the plurality of object has a target pickup region;
    obtaining destination information of the plurality of objects according to the object information, wherein the destination information of the plurality of objects comprises a plurality of destinations of the plurality of objects;
    determining a plurality of colors corresponding to the plurality of objects according to the plurality of destinations of the plurality of objects;
    for one of the plurality of objects, turning on a segment of a light strip disposed on a side of the production line with a determined color corresponding to the object, wherein the segment of the light strip, visually observed, moves as the object moves and stops when the object reaches to a corresponding target pickup region;
    distinguishing the plurality of objects by using the plurality of colors respectively, to sort the plurality of objects in motion having the plurality of destinations; and
    in response to that the object is not picked up in the corresponding target pickup region, turning off the segment of light strip corresponding to the object as the object passes through subsequent pickup regions.

2. The method according to claim 1, further comprising: setting correspondences between different colors and different destinations in advance.

3. The method according to claim 2, wherein determining a plurality of colors corresponding to the plurality of objects according to the plurality of destinations of the plurality of objects comprises:
    determining the plurality of colors corresponding to the plurality of objects according to the correspondences and the obtained destination information of the plurality of objects.

4. The method according to claim 1, wherein distinguishing the plurality of objects by using the plurality of colors further comprises:
    projecting a plurality of spotlight beams of the plurality of colors onto the plurality of objects respectively by using a plurality of projection light sources.

5. The method according to claim 4, wherein the plurality of projection light sources comprise one or more groups of projection light sources.

6. The method according to claim 5, wherein the one or more groups of projection light sources comprise two or three groups of projection light sources.

7. The method according to claim 1, wherein the object information comprises barcode information.

8. The method according to claim 7, wherein recognizing object information of a plurality of objects in motion comprises:
    recognizing the barcode information by using a camera or a code reading device.

9. The method for object sorting of claim 1, further comprising:
    after the object passes through subsequent pickup regions, placing the object back on the product line again for pickup.

10. A system for object sorting, comprising a production line, a camera or a code reading device disposed on a top portion of the production line or disposed on a side portion of the production line, a control device, and a lighting device communicatively connected with the control device, wherein a plurality of objects in motion are to be transported on the production line, and wherein:
    the camera or code reading device is configured to recognize object information of the plurality of objects in motion on the production line, wherein the production line comprises a plurality of pickup regions for picking up the plurality of objects, and each of the plurality of object has a target pickup region;
    the control device is configured to:
    obtain destination information of the plurality of objects according to the object information, wherein the destination information of the plurality of objects comprises a plurality of destinations of the plurality of objects;

determine a plurality of colors corresponding to the plurality of objects according to the plurality of destinations of the plurality of objects;

output a control signal to the lighting device, to control the lighting device to distinguish the plurality of objects by using the plurality of colors, wherein the lighting device comprises a light strip disposed on the production line for sorting the plurality of objects in motion having the plurality of destinations, wherein for one of the plurality of objects, the control signal turns on a segment of the light strip with the determined color corresponding to the object, and the segment of the light strip, visually observed, moves as the object moves, and stops when the object reaches to a corresponding target pickup region; and in response to that the object is not picked up in the corresponding target pickup region, turn off the segment of light strip corresponding to the object as the object passes through subsequent pickup regions.

11. The system according to claim 10, further comprising a plurality of sensors disposed on the production line and configured to sense the plurality of objects in motion, wherein the light strip is disposed on the side portion of the production line; and the control device is further configured to turn on, upon one of the plurality of sensors sensing one of the plurality of objects, the segment of the light strip with the determined color corresponding to the object at a location corresponding to the object.

12. The system according to claim 10, wherein the control device is further configured to set correspondences between different colors and different destinations in advance.

13. The system according to claim 12, wherein to determine a plurality of colors corresponding to the plurality of objects according to the plurality of destinations of the plurality of objects, the control device is further configured to:

determine the plurality of colors corresponding to the plurality of objects according to the correspondences and the obtained destination information of the plurality of objects.

14. The system according to claim 10, wherein the camera is a high-definition camera.

15. The system according to claim 10, wherein a distance between camera or code reading device and the plurality of objects in motion on a production line is adjustable.

16. The system according to claim 10, further comprising one or more groups of projection light sources.

17. The system according to claim 16, wherein the lighting device is configured to project, in response to the control signal, a plurality of spotlight beams of the plurality of colors onto the plurality of objects respectively by using the one or more groups of projection light sources.

18. The system according to claim 16, wherein the light strip comprises two or three groups of projection light sources.

19. The system according to claim 16, wherein each of the one or more groups of projection light sources comprises two or more light sources of different colors.

* * * * *